United States Patent
Zamel et al.

[11] Patent Number: 5,991,015
[45] Date of Patent: Nov. 23, 1999

[54] BEAM MONITORING ASSEMBLY

[75] Inventors: James M. Zamel; John A. Szot, both of Hermosa Beach; Richard H. Moyer, Rolling Hills Estates, all of Calif.

[73] Assignee: TRW Inc., Redondo Beach, Calif.

[21] Appl. No.: 09/167,292

[22] Filed: Oct. 6, 1998

[51] Int. Cl.[6] .................................................. G05D 25/00
[52] U.S. Cl. ........................... 356/222; 356/6; 356/121; 219/121.61; 219/121.62
[58] Field of Search ............................... 356/6, 121, 124, 356/222; 372/98, 92, 101; 219/121.61, 121.62

[56] References Cited

U.S. PATENT DOCUMENTS

| | | | |
|---|---|---|---|
| 5,408,318 | 4/1995 | Slater | 356/351 |
| 5,872,626 | 2/1999 | Lipscomb | 356/141.3 |

*Primary Examiner*—Robert H. Kim
*Assistant Examiner*—Layla Lauchman
*Attorney, Agent, or Firm*—Michael S. Yatsko

[57] ABSTRACT

A beam monitoring assembly (10) that provides near-field imaging, far-field imaging and power measurements of a laser beam (12) in real-time for alignment and performance verification purposes. The monitoring assembly (10) includes a holographic beam splitter (24) that splits the laser beam (12) from the laser resonator cavity into a series of separate split beams (28, 30, 32) having varying beam powers. One of the split beams (28) is directed to a power meter (36) to measure the power of the beam (12). One of the split beams (28) is directed to a near-field camera (42) that provides a near-field image of the beam (12). Another one of the split beams (30) is directed to a heat dump (52) that absorbs and removes the beam's energy from the assembly. Another one of the split beams (32) is directed to a far-field lens (46) that focuses the split beam (32) onto a far-field camera (50) that provides a far-field image of the beam (12). The near-field and far-field images of the beam (12) are displayed on an operator control panel in real time. Suitable computer electronics (38) and camera electronics (58) are provided to process the electrical signals from the power meter (36) and the cameras (42, 50).

19 Claims, 1 Drawing Sheet

BEAM MONITORING ASSEMBLY

BACKGROUND OF THE INVENTION

1. Field of the Invention

This invention relates generally to a beam monitoring assembly that monitors a laser beam for alignment and performance verification purposes and, more particularly, to a beam monitoring assembly that provides real time, non-intrusive monitoring of the near-field and far-field spacial mode and beam power of a laser beam using beam optics included in a laser head enclosure.

2. Discussion of the Related Art

High power, solid state lasers, such as diode slab lasers, that are used for many purposes, such as cutting, drilling and welding of various materials for precision laser machining (PLM), electronics manufacture, medical treatment, nuclear fusion, laser weapons, etc., are known in the art. A solid state slab laser will include one or more gain modules each having a solid state laser gain medium, such as a crystal of neodymium yttrium aluminum garnet (Nd:YAG), Yb:YAG, Ti:sapphire or neodymium glass (Nd:glass), and an optical pumping source to produce a population inversion in the gain medium. The gain medium typically has a slab configuration with a rectangular cross-section, an optically polished major side and end faces. The optical pumping source generally is one or more diode arrays positioned adjacent to the side faces of the slab. The laser gain medium absorbs light radiation from the diode arrays to create a population inversion within the medium to produce a laser beam output. The end faces of the slab are preferably formed at a non-perpendicular angle to the side faces so that light travels longitudinally in a zig-zag pattern through the laser gain medium as it is reflected off of the side faces. A high power solid state slab laser of this type is disclosed in U.S. Pat. No. 5,555,254 issued to Injeyan et al., Sep. 10, 1996, and U.S. Pat. application Ser. No. 08/683,585, filed Jul. 15, 1996, titled "Diode Laser Pumped Solid State Laser Gain Module", and assigned to the assignee of the instant invention.

The diode arrays are switched on and off or pumped in a controlled manner to generate a pulsed laser beam emitted from the gain medium that has a particular pulse rate and pulse width. The light output of the diode arrays can be accurately tuned to the absorption line of the active material of the laser gain medium to achieve a high pumping efficiency. An increase in the pulse rate and/or pulse width increases the power output of the laser beam. The diode arrays are fired in a controlled manner to set the pulse width and pulse rate of the output beam. The firing of the various diode arrays for multiple gain modules can be controlled independently of each other in sequence to further control the overall pulse width and rate for the laser beam, or generate a continuous wave (CW) beam. Therefore, depending on the particular application, the pulse rate and pulse width of the beam output is controlled for efficient laser operation for that application.

The type of solid state laser described above currently has a wide application in PLM. To perform a PLM operation, a laser operator will calibrate or program a controller that controls the laser to operate the laser beam at a desired power level and machining sequence to perform the desired machining operation. A single machining operation may include various degrees of cutting, welding, and drilling of a single workpiece or multiple workpieces. For example, the machining operation may require a welding operation and then immediately thereafter, drilling of a series of holes and/or cutting the workpiece. The welding operation generally requires different power levels than cutting and drilling operations, and the welding process itself may require different laser power levels. For example, welding around a corner of the workpiece may require a decrease in power because the welding operation may have to be slowed down and the resulting higher power may damage or burn the material of the workpiece at the slower speed. Further, the laser can be calibrated to weld a certain material, such as steel. If the operator then changes to a different material, such as a different steel, aluminum, copper, etc., different laser settings and output parameters would be required.

It is necessary to align the resonator cavity components of a laser for proper laser operation. To do this, a visual representation of the beam needs to be provided. Also, laser machines for PLM operations generally require a very bright and stable optical beam. It is therefore desirable to visually monitor beam quality and beam performance during a machining operation to maintain high precision machining. This image may also be used in an electronic image processing system that can actively control the alignment of the laser. It is important to verify the performance of the laser beam without interrupting the laser operation during material processing on factory floors, because the down-time of the laser system affects production schedules, and poor beam quality from varying output power effects product quality.

In order to provide beam alignment and monitor beam performance during a machining operation, it is beneficial to display the near-field and far-field images of the beam. The near-field image is the image of the beam as it leaves the laser, and the far-field image is the image of the beam at its focus, such as when it contacts the workpiece. In order to have a suitable beam performance for machining operations such as cutting and drilling, the near-field image of the beam needs to have a high degree of intensity and wave front uniformity, and the far-field image needs to have a high degree of beam circularity and intensity uniformity.

Optical systems are known for displaying the near-field and far-field images of a laser beam. However, these optical systems are typically large compared to the laser itself, and are not readily compatible to being combined with existing laser systems because of cost, complexity and size.

It is an object of the present invention to provide a beam monitoring assembly that provides beam alignment and performance capabilities by non-intrusive monitoring of the near-field spacial mode and the far-field spacial mode of a laser beam in a small compact package that can be readily positioned in a laser head enclosure.

SUMMARY OF THE INVENTION

In accordance with the teachings of the present invention, a beam monitoring assembly is disclosed that provides near-field imaging, far-field imaging and power measurements of a laser beam in real-time for alignment and performance verification purposes. The monitoring assembly includes a holographic beam splitter that splits the laser beam from the laser into a series of separate split beams having varying beam powers. A portion of this beam is directed to a power meter to measure the power of the beam. One of the split beams is directed to a near-field camera that provides a near-field image of the beam. Another one of the split beams is directed to a far-field lens that focuses the split beam onto a far-field camera that provides a far-field image of the beam. The near-field and far-field images of the beam are displayed on an operator control panel in real-time. Suitable computer electronics and camera electronics are provided to process the electrical signals from the power meter and cameras.

In one embodiment, the beam splitter, near-field and far-field cameras, power meter and other optics and electronics are mounted to a common base plate, all positioned within a common housing of a compact size suitable to fit in a laser head enclosure. The base plate is cooled by a suitable cooling system to reduce inaccuracies caused by heating of the optical components.

Additional objects, advantages, and features of the present invention will become apparent from the following description and appended claims, taken in conjunction with the accompanying drawings.

DETAILED DESCRIPTION OF THE PREFERRED EMBODIMENTS

The following discussions of the preferred embodiments directed to a beam monitoring assembly for monitoring the beam of a laser is merely exemplary in nature, and is in no way intended to limit the invention or its applications or uses.

Figure 1:
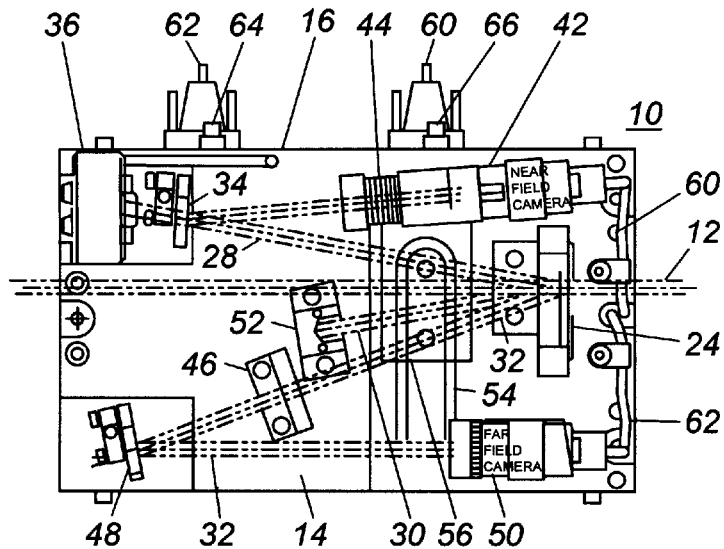
FIG. 1 is a top plan view of a beam monitoring assembly according to an embodiment of the present invention.
Figure 2:
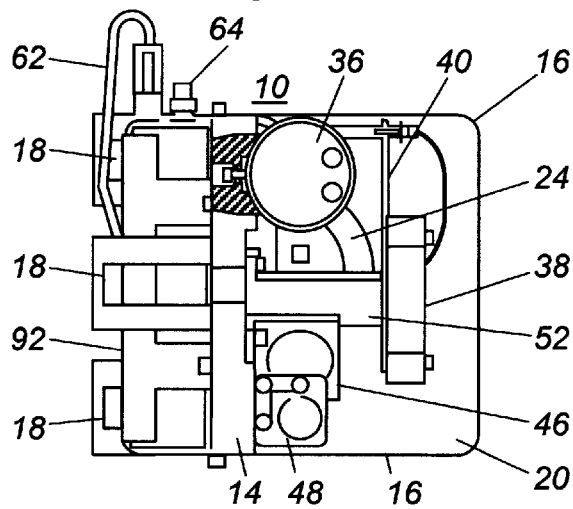
FIG. 2 is an end plan view of the beam monitoring assembly shown in FIG. 1.
Figure 3:
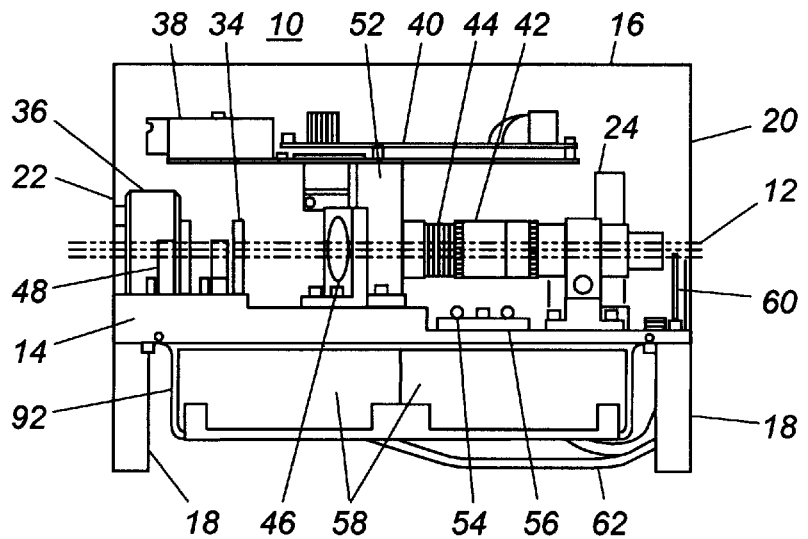
FIG. 3 is a side plan view of the beam monitoring assembly shown in FIG. 1.

FIG. 1 shows a top plan view, FIG. 2 shows an end plan view, and FIG. 3 shows a side plan view of a beam monitoring assembly 10 according to the invention. As will be discussed in detail below, the beam monitoring assembly 10 is positioned in the path of a laser beam 12 generated by a laser (not shown) to provide a near-field image, a far-field image and a power measurement of the beam 12 during real time operation of the laser. The assembly 10 can be used with any type of suitable laser, and has a particular application for a diode slab laser (discussed above) used in PLM operations. The assembly 10 is intended to be included within a laser head enclosure as an accessory, and is thus compact in size for this purpose. Diode slab lasers of the type used in PLM operations typically include a control panel (not shown) that an operator of the machining operation uses to control the machining process. The control panel would include processing circuitry and display devices to allow the operator to view the near-field and far-field images, and the power measurement of the beam 12 for resonator cavity alignment and during the machining process for performance verification.

The assembly 10 includes various optical components secured to a common base plate 14 by bolts or the like within a metal housing 16. The base plate 14 has different levels, as shown, to accommodate the positioning of the various optical components within the housing 16, as will be described in more detail below. The housing 16 is mounted to an optical bench (not shown) by three mounting brackets 18 at a location just beyond the laser resonator cavity (not shown) so that entrance and exit apertures (not shown) in the ends of the housing 16 are aligned with the laser beam 12. The laser beam 12 enters the housing 16 through the entrance aperture in an end plate 20, and exits the housing through the exit aperture in an end plate 22.

The beam 12 enters the housing 16 and contacts a holographic beam splitter 24 that is bolted to the base plate 14 in a position relative to the entrance aperture. The beam splitter 24 is a commercially available optical product from Gentec, Inc. of Quebec, Canada, and its operation is well known to those skilled in the art. In one embodiment, most of the intensity of the beam 12 passes straight through the beam splitter 24, where about 0.2% of the beam 12 is split off. The beam splitter 24 operates by emitting a split beam on each side of the laser beam 12 every 10° relative to the propagation direction of the laser beam 12 in a fanning out type arrangement. Split beams at greater angles from the laser beam 12, successively drop off in intensity by about three magnitudes. A first split beam 28 and a second split beam 30 are separated from the laser beam 12, and are directed about 10° relative to the direction of the beam 12 on each side of the beam 12. Both of the split beams 28 and 30 have an intensity of about $1\times10^{-3}$ of the intensity of the beam 12. A third split beam 32 is separated from the laser beam 12 in a direction of about 20° relative to the propagation direction of the beam 12, and has an intensity of about $1\times10^{-6}$ of the intensity of the beam 12. Although not shown, this pattern of split beam continues out from the beam splitter 24 with decreasing intensity. The other beams are not shown, and because their intensity is so low, they do not interfere with the operation of the monitoring assembly 10.

The split beam 28 contacts an optical splitter in a mount 34, such as a glass wedge, that is bolted to the base plate 14. Most of the intensity of the split beam 28 passes through the splitter 34 and contacts a power meter 36, also bolted to the base plate 14 in the appropriate position. The power meter 36 is a known optical power meter also available from Gentec, Inc. and has part number PS310. In this embodiment, the power meter 36 has a diameter of about two inches. The power meter 36 generates an electrical signal based on the intensity of the split beam 28 that is then processed and displayed on the operator control panel. Because the proportionality of the split portion of the beam 28 from the laser beam 12 is known, the power of the laser beam 12 can be determined in real-time to more accurately monitor the machining operation. A computer communications electronics unit 38 is mounted to the base plate 14 by a mounting structure 52, and provides the electronics for processing the signals from the power meter 36. In one embodiment, the communications electronics unit 38 is a remote modulator data acquisition that provides an analog to RS485 communications computer connection, and is available from Industrial Computer Source of San Diego, Calif.

A portion of the split beam 28 (approximately 2–3%) is reflected from the splitter 34, and is directed towards a near-field camera 42 bolted to the base plate 14 in a position to be in line with the reflected portion of the beam 28. The reflected beam 28 passes through a series of neutral density filters 44 in front of the camera 42 to reduce the intensity of the reflected beam 28 to prevent saturation of the camera 42. The near-field camera 42 is a commercially available camera from Cohu of San Diego, Calif. The camera 42 provides electrical signals indicative of an image of the split beam 28, which is a reproduction of the laser beam 12, that is displayed on the operator control panel.

The split beam 32 impinges a far-field lens 46 bolted to the base plate 14 in a position to be aligned with the beam 32. In one embodiment, the lens 46 is a 300 mm focusing lens to provide the far-field focusing, and produce a representation of the beam 12 as it would appear at the workpiece (not shown). The focused beam 32 is reflected off of a mounted reflector 48, also bolted to the base plate 14, and is directed to a far-field camera 50. The far-field camera 50 is also bolted to the base plate 14 in a position to be aligned with the focused and reflected beam 32. The lens 46 focuses the image of the laser beam 12 onto the optics of the far-field camera 50 to generate a far-field image of the laser beam 12. The far-field camera 50 is also available from Cohu. As is apparent, because the split beam 28 is one beam away from the laser beam 12, and the split beam 32 is two beams away from the laser beam 12, the intensity of the split beam 32 is three magnitudes in intensity lower than the intensity of the split beam 28. Of course, as discussed above, the intensity of the beam that actually contacts the near-field camera 42 is much less than the intensity of the split beam 28 because of the operation of the splitter 34.

The split beam 30 is not used by the monitoring assembly 10, and is therefore sent to a heat dump 52 that is bolted to the base plate 14. The heat dump 52 can be any optical collector, such as a block of aluminum, that is suitable to collect the beam 30. It is necessary to collect the beam 30 to prevent it from interfering with the operation of the assembly 10 because it has a significantly higher power than the other beams split from the splitter 24. A cooling tube 54 acts to cool the base plate 14 to increase the accuracy of the assembly 10. The cooling tube 54 is soldered to a metal block 56 that is bolted to the base plate 14. By running a cooling fluid, such as water from a fluid source (not shown), through the tube 54, the base plate 14 can be suitably cooled to reduce the heat build-up within the housing 16.

Two camera electronics units 58 are supported by a metal tray, 91, located under and bolted to the base plate 14 by bolts outside of the housing 16 and between the mounting brackets 18. Each camera electronics unit 58 receives the electrical signals from the near-field camera 42 and the far-field camera 50 over electrical cables 60 and 62, respectively. The camera electronics units 58 are connected to the control panel by electrical cables (not shown) attached at electrical connectors 64 and 66 to connect the camera electronics 58 to the control panel.

The beam monitoring assembly 10 of the invention is intended to be of a compact size suitable to be positioned within a laser head enclosure, such as the enclosure for a diode slab laser. In one embodiment, the laser beam 12 has a beam height of about 0.35 inches, and the distance between the bottom of the brackets 18 and the center of the beam 12 is about 4.675 inches. The assembly 10 has a length of about 12.9 inches, a width of about 7.4 inches and a height of about 8.7 inches.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A beam monitoring assembly for monitoring a laser beam, said assembly comprising:
    a housing, said housing including a housing mounting plate and an entrance aperture receiving the laser beam;
    a beam splitter mounted to the mounting plate within the housing in a position to receive the laser beam, said beam splitter splitting the laser beam into a plurality of split beams;
    a power meter mounted to the mounting plate in a position to receive one of the split beams, said power meter providing an output signal indicative of the power of the split beam;
    a near-field camera mounted to the mounting plate in a position to receive one of the split beams, said near-field camera generating an output signal indicative of a near-field image of the laser beam;
    a far-field lens mounted to the mounting plate in a position to receive one of the split beams, said far-field lens focusing the split beam; and
    a far-field camera mounted to the mounting plate in a position to receive the focused beam from the far-field lens, said far-field camera generating an output signal indicative of a far-field image of the laser beam.

2. The assembly according to claim 1 wherein the beam splitter is a holographic beam splitter that splits the laser beam into the plurality of split beams, said split beams fanning out from the beam splitter and each split beam having a descending power intensity relative to the angular distance the split beam is from the laser beam.

3. The assembly according to claim 1 wherein the power meter and the near-field camera are positioned to receive the same split beam from the beam splitter, said assembly further comprising an optical splitter positioned to receive one of the split beams, said optical splitter directing a portion of the split to the power meter and reflecting a portion of the split beam to the near-field camera.

4. The assembly according to claim 1 further comprising an excess heat dump, said heat dump being mounted to the mounting plate in a position to receive one of the split beams.

5. The assembly according to claim 1 further comprising camera electronics mounted to the mounting plate outside of the housing on an opposite side of the mounting plate from the power meter, the near-field camera and the far-field camera.

6. The assembly according to claim 1 further comprising a cooling system mounted to the mounting plate.

7. The assembly according to claim 6 wherein the cooling system includes a cooling tube that passes a cooling fluid.

8. The assembly according to claim 1 further comprising a series of neutral density filters, said neutral density filters receiving the split beam that is received by the near-field camera to reduce the intensity of the split beam.

9. The assembly according to claim 1 further comprising a mirror mounted to the mounting plate in a position to receive the split beam received by the far-field camera, said mirror reflecting the split beam to said far-field camera.

10. A beam monitoring assembly for monitoring an optical beam, said assembly comprising:
    a common mounting plate;
    a beam splitter mounted to the mounting plate, and splitting the optical beam into a plurality of split beams;
    a near-field camera mounted to the mounting plate in a position to receive one of the split beams, said near-field camera generating an output signal indicative of a near-field image of the laser beam; and
    a far-field camera mounted to the mounting plate in a position to receive one of the split beams, said far-field camera generating an output signal indicative of a far-field image of the laser beam; and
    a power meter mounted to the mounting plate in a position to receive one of the split beams, said power meter providing an output signal indicative of the power of the split beam.

11. The assembly according to claim 10 wherein the beam splitter splits the optical beam into the plurality of split beams such that several of the split beams have significant differences in power intensity, said near-field camera receiving a split beam that has a significant power difference than the split beam that is received by the far-field camera.

12. The assembly according to claim 11 wherein the power meter and the near-field camera are in a position to receive the same split beam from the beam splitter.

13. The assembly according to claim 12 further comprising an optical splitter positioned to receive the one split beam received by the power meter, said optical splitter passing a portion of the beam received by the power meter to be received by the power meter and reflecting a portion of the beam received by the power meter to be received by the near-field camera.

14. The assembly according to claim 10 further comprising a far-field lens mounted to the mounting plate in a position to receive the split beam received by the far-field camera, said far-field lens focusing the split beam onto the far-field camera.

15. The assembly according to claim 10 further comprising camera electronics mounted to the mounting plate on an opposite side of the mounting plate from the near-field camera and the far-field camera.

16. The assembly according to claim 10 further comprising a cooling system mounted to the mounting plate.

17. A beam monitoring assembly for monitoring a laser beam, said assembly comprising:

a housing, said housing including a housing mounting plate and an entrance aperture receiving the laser beam;

a holographic beam splitter mounted to the mounting plate within the housing in a position to receive the laser beam, said beam splitter splitting the laser beam into a plurality of split beams that fan out from the laser beam, each split beam having a descending power intensity relative to the distance the split beam is from the laser beam;

an optical splitter mounted to the mounting plate within the housing in a position to receive a first one of the split beams, said optical splitter passing a major portion of the first one of the split beams and reflecting a minor portion of the first one of the split beams;

a power meter mounted to the mounting plate in a position to receive the major portion of the first one of the split beams, said power meter providing an output signal indicative of the power of the major portion of the split beam;

a near-field camera mounted to the mounting plate within the housing in a position to receive the minor portion of the first one of the split beams, said near-field camera generating an output signal indicative of a near-field image of the laser beam;

a far-field lens mounted to the mounting plate within the housing in a position to receive a second one of the split beams, said far-field lens focusing the second one of the split beams;

a far-field camera mounted to the mounting plate within the housing in a position to receive the focused beam from the far-field lens, said far-field camera generating an output signal indicative of a far-field image of the laser beam; and camera electronics mounted to the mounting plate outside of the housing on an opposite side of the mounting plate from the beam splitter, the power meter, the near-field camera.

18. The assembly according to claim 17 further comprising a cooling system mounted to the mounting plate within the housing.

19. The assembly according to claim 17 further comprising an excess heat dump, said excess heat dump being mounted to the mounting plate in a position to receive one of the split beams.

* * * * *